US010976909B2

(12) United States Patent
Bielmeier et al.

(10) Patent No.: US 10,976,909 B2
(45) Date of Patent: Apr. 13, 2021

(54) OPERATING MODULE AND METHODS FOR DYNAMIC ADAPATATION OF A USER INTERFACE FOR A MACHINE

(71) Applicant: KRONES AG, Neutraubling (DE)

(72) Inventors: Theodor Bielmeier, Regenstauf (DE); Sebastian Vogl, Regensburg (DE); Raymon Seidl, Rosenheim (DE); Timo Pronold, Wiesent (DE); Thomas Stauber, Obertraubling (DE); Johannes Boehm, Regensburg (DE); Stefan Schmidt, Regensburg (DE); Pino-Giuseppe Palumbo, Kolbermoor/Lohholz (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 15/773,092

(22) PCT Filed: Oct. 6, 2016

(86) PCT No.: PCT/EP2016/073832
§ 371 (c)(1),
(2) Date: May 2, 2018

(87) PCT Pub. No.: WO2017/076568
PCT Pub. Date: May 11, 2017

(65) Prior Publication Data
US 2018/0321832 A1 Nov. 8, 2018

(30) Foreign Application Priority Data
Nov. 3, 2015 (DE) .................. 10 2015 221 517.2

(51) Int. Cl.
*G06F 3/0484* (2013.01)
*G05B 19/409* (2006.01)
(Continued)

(52) U.S. Cl.
CPC .......... *G06F 3/04847* (2013.01); *G05B 15/02* (2013.01); *G05B 19/409* (2013.01); *G06F 3/0482* (2013.01); *G05B 2219/36133* (2013.01)

(58) Field of Classification Search
CPC ... G06F 3/04847; G06F 3/0482; G05B 15/02; G05B 19/409; G05B 2219/36133
(Continued)

(56) References Cited

U.S. PATENT DOCUMENTS

| 9,436,365 B2 | 9/2016 | Kiyota et al. | |
| 2004/0182574 A1* | 9/2004 | Adnan | E21B 44/00 166/250.01 |

(Continued)

FOREIGN PATENT DOCUMENTS

| CN | 102123938 A | 7/2011 |
| DE | 102008053765 A1 | 4/2010 |

(Continued)

OTHER PUBLICATIONS

"Production-line;" Aug. 1, 2014; Dictionary.com; pp. 1-3.*
(Continued)

*Primary Examiner* — Andrew R Dyer
(74) *Attorney, Agent, or Firm* — McCoy Russell LLP

(57) ABSTRACT

The present invention relates to an operating module for dynamically creating the user interface on the operating module for controlling and operating a machine of the food industry, in particular the beverage industry. The operating module comprises a plurality of operating elements having attributes, which can assume the value of a parameter and can be activated or deactivated depending on the user. By means of an operating module context, operating elements having certain attributes and values can be selected in order to be displayed on the operating module. The invention further relates to a method for dynamically creating and
(Continued)

displaying an operating interface for operating a machine of the food industry.

13 Claims, 5 Drawing Sheets

(51) Int. Cl.
*G05B 15/02* (2006.01)
*G06F 3/0482* (2013.01)

(58) Field of Classification Search
USPC .......................................... 715/845
See application file for complete search history.

(56) References Cited

U.S. PATENT DOCUMENTS

| | | | | |
|---|---|---|---|---|
| 2005/0108992 | A1* | 5/2005 | Wagner | B65G 17/26 53/471 |
| 2008/0004973 | A1* | 1/2008 | Rothschild | B67D 1/0041 705/14.46 |
| 2009/0069947 | A1* | 3/2009 | Newman | B67D 1/0021 700/281 |
| 2009/0278839 | A1* | 11/2009 | Geis | G06F 3/04886 345/418 |
| 2010/0050097 | A1* | 2/2010 | McGreevy | G06F 3/0484 715/762 |
| 2011/0068899 | A1* | 3/2011 | Ioffe | G05B 15/02 340/8.1 |
| 2011/0106288 | A1* | 5/2011 | Catoen | B29C 45/76 700/108 |
| 2011/0118868 | A1 | 5/2011 | Herrmann et al. | |
| 2013/0106690 | A1* | 5/2013 | Lim | G07F 13/065 345/156 |
| 2015/0212718 | A1 | 7/2015 | Kellhammer et al. | |
| 2015/0316909 | A1* | 11/2015 | Govindaraj | G06F 16/285 700/19 |
| 2015/0316911 | A1* | 11/2015 | Rischar | G05B 15/02 700/9 |
| 2016/0004382 | A1* | 1/2016 | West | G07F 9/00 345/173 |
| 2018/0329677 | A1* | 11/2018 | Gruber | G06F 3/0488 |

FOREIGN PATENT DOCUMENTS

| | | |
|---|---|---|
| DE | 102012216770 A1 | 3/2014 |
| DE | 102014218211 A1 | 3/2015 |
| EP | 1895374 A2 | 3/2008 |

OTHER PUBLICATIONS

Wilbert O. Galitz; The Essential Guide to User Interface Design; 2002; Wiley Computer Publishing; Second Edition; pp. 477-479.*
ISA European Patent Office, International Search Report Issued in Application No. PCT/EP2016/073832, dated Jan. 11, 2017, WIPO, 4 pages.
State Intellectual Property Office of the People's Republic of China, Office Action and Search Report Issued in Application No. 201680063534.6, dated May 29, 2020, 13 pages. (Submitted with Partial Translation).

* cited by examiner

OPERATING MODULE AND METHODS FOR DYNAMIC ADAPATATION OF A USER INTERFACE FOR A MACHINE

CROSS-REFERENCE TO RELATED APPLICATIONS

The present application is a U.S. National Phase of International Patent Application Ser. No. PCT/EP2016/073832 entitled "OPERATING MODULE FOR A MACHINE IN THE FOOD INDUSTRY," filed on Oct. 6, 2016. International Patent Application Ser. No. PCT/EP2016/073832 claims priority to German Patent Application No. 10 2015 221 517.2, filed on Nov. 3, 2015. The entire contents of each of the abovementioned applications are hereby incorporated by reference in their entirety for all purposes.

TECHNICAL FIELD

The present invention relates to an operating module for controlling and operating a machine in the food industry, in particular in the beverage industry, and to a method of dynamically creating and displaying a user interface for operating a machine.

PRIOR ART

In the field of industrial production, operating modules, such as "Human Machine Interfaces" (HMIs), are a common means for controlling and monitoring production processes in which a multitude of machines and machine modules often participates. However, not only specialized operating modules for a specific module or a specific machine are common means for executing control, but also cross-functional computer programs by means of which a plurality of machines can be controlled by standard computer systems. Likewise, the number of operating modules is increasingly reduced and a smaller number of operating modules is used, which, however, have a broader scope of functions. According to today's prior art, machines and plants are predominantly operated via software solutions that are specially developed for this purpose.

BACKGROUND AND SUMMARY

Hence, there is an enormous increase in the scope and, consequently, in the complexity of such computer programs and operating modules, and a high navigation effort is required. Normally, a plant comprises eight or more machines of a manufacturer, which act as a plant via an exchange of signals and start and stop the production in a well-matched manner.

Complex plants, such as a production line for blow-molding, labeling, filling and closing of containers, may thus have several hundred pages of operating elements. For structuring the content of the operating pages, the classical, fixed menu concept comprising main menu items and 1-n subitems, into which the contents are fixedly incorporated, is normally chosen. A similar concept is the principle of a main button bar supplemented by a second button bar, e.g. tabs for subgroups for the respective main buttons. The fixed structure of a menu and the incorporation of the contents onto the system. The future user, however, often thinks differently and will have problems finding the contents and retrieving contents, since the approach is not logical from his point of view and, consequently, not reproducible. The situation will become even more problematic, if different groups of users with different experiences and different tasks must work with one and the same fixedly defined structure. Since the mental models are all different, it will be impossible to optimally support all of them by the menu structure. Eventually, a more or less satisfactory compromise will be made, or one group of users will deliberately be supported better than the others.

The navigation effort entailed by classical menu navigation is a safety-critical aspect. In order to be able to react quickly to production processes and events, it is important that a user will quickly find the appropriate operating elements and that the navigation time will be reduced to a minimum.

Object

Hence, it is the object of the present invention to provide an operating module for a machine of the food industry, in particular of the beverage industry, for improved control of the machine, and a corresponding method.

Solution

According to the present invention, this object is achieved by an operating module and a method.

An embodiment of the present invention relates to an operating module for controlling and operating a machine in the food industry, in particular in the beverage industry. The operating module may be configured for displaying a user interface for operating the machine. The user interface according to the present invention comprises one or a plurality of operating elements from a multitude of operating elements. The multitude of operating elements is stored in a storage unit. Each of the operating elements may have assigned thereto a multitude of attributes and each of the assigned attributes may have allocated thereto at least one value.

In addition, the operating module may be configured for dynamically creating the user interface on the operating module. The dynamic creation may comprise a plurality of separate steps.

In a first step, e.g. an operating module context may be acquired. The operating module context may specify one or a plurality of parameters and each parameter may specify one or a plurality of values for an attribute.

For each of the attributes of the one or of the plurality of parameters, a subset from the multitude of operating elements may be determined in a further step. The subset may comprise all the operating elements having at least one specified value of the attribute.

In a further step, the one or the plurality of operating elements to be displayed on the user interface may be determined from the subsets. The operating elements to be displayed may be those operating elements which are comprised as an intersection in all the subsets.

BRIEF DESCRIPTION OF FIGURES

Embodiments according to the present invention are described on the basis of the following drawings, in which.

DETAILED DESCRIPTION

Figure 1:
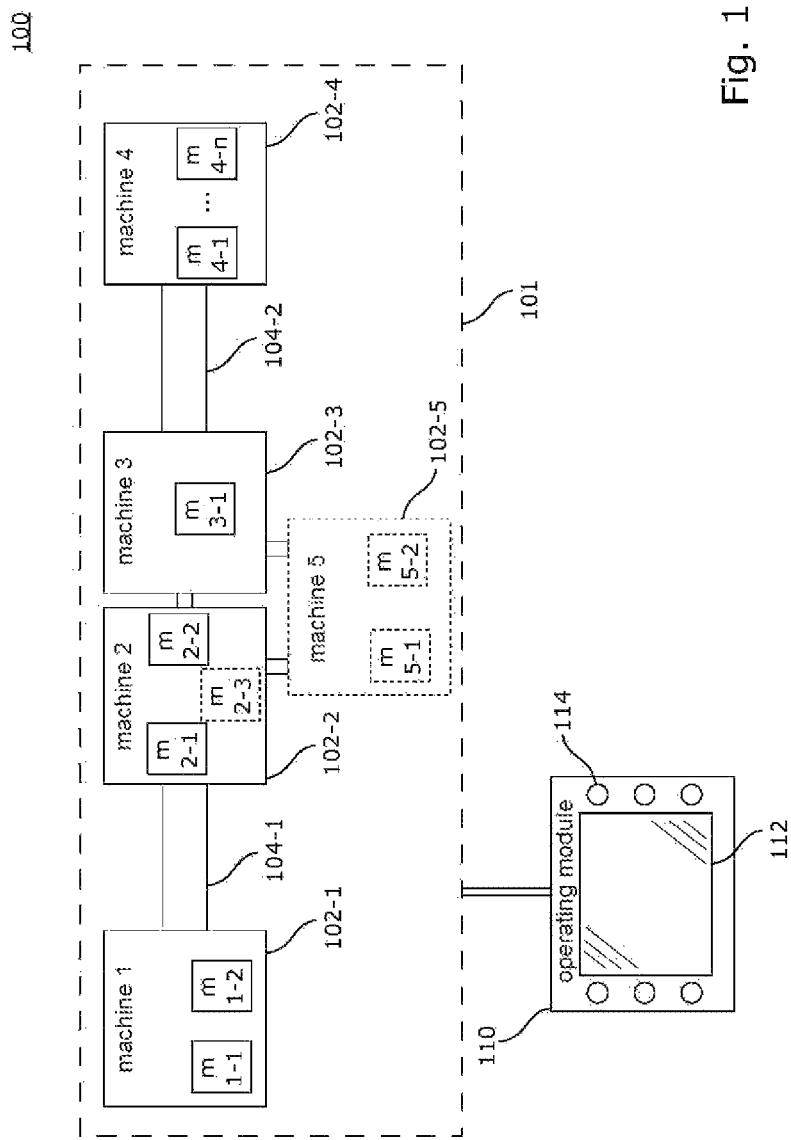
FIG. 1 shows a system comprising a multitude of machines and machine modules in a production line, which are controlled by an operating module, according to an embodiment of the invention.

FIG. 1 shows a combination of machines 102-1, 102-2, 102-3, 102-4, 102-5, which are coupled in a production line 101. As can be seen, the various machines may each consist of one or of a plurality of modules, such as the machine 1 102-1 that consists of the two modules m1-1 and m1-2. Some modules may be replaceable or optional, such as the module m2-3 in the machine 2 102-2. In the production line 101 also complete machines may be retrofittable or replaceable, such as the machine 5 102-5 comprising the modules m5-1 and m5-2, said machine being replaceable by one or by a plurality of other machines in accordance with various scenarios. The machines may additionally be connected by various conveyor belts, such as conveyor belt 104-1 and conveyor belt 104-2.

An example for such a production line 101 may e.g. be a filling line in the beverage industry, which, in addition to the task of filling, executes also other processes, such as blow-molding, labeling and closing beverage containers. However, the present invention is not limited to the control of specific machines in industrial production, but may also be used for other machines and machine modules.

FIG. 1 additionally shows an operating module 110 coupled to the production line 101. In the exemplary embodiment according to FIG. 1, the operating module 110 may control each of the machines 1, 2, 3, 4, 5 and all the modules comprised therein and may also control the conveyor belts 104-1 and 104-2. In an alternative embodiment, the operating module 110 may be only one of a plurality of operating modules, which controls only one of the machines or a subgroup of the machines or modules. The operating module 110 according to FIG. 1 may comprise a screen 112 on which a control surface can be displayed to a user. In addition, the operating module 110 may also comprise one or a plurality of input devices 114 through which a user will be able to enter control commands and menu navigation commands into the operating module 110. The input devices 114 may, for example, be buttons, controllers, switches, control levers, a trackpad, a keyboard, a mouse, a camera or any other device for inputting a user command.

According to one embodiment, the operating module 110 may be a HMI (Human Machine Interface) whose screen 112 may be a touchscreen. The present invention is, however, not limited to a special physical form of the operating module 110. Further examples for an operating module 110 may be a mobile phone, a portable computer, a server, a terminal, a desktop PC or a tablet PC.

Due to the desired scalability of the production line 101, also the complexity of menu navigation of the operating module 110 increases enormously. It can be assumed that each of the machines 102 according to FIG. 1 comprises a multitude of operating pages, each with a multitude of operating elements. The more complex a machine, the higher the number of operating pages for various interactions with the machine that must be available in and comprised in a control program for the plant.

Figure 2:
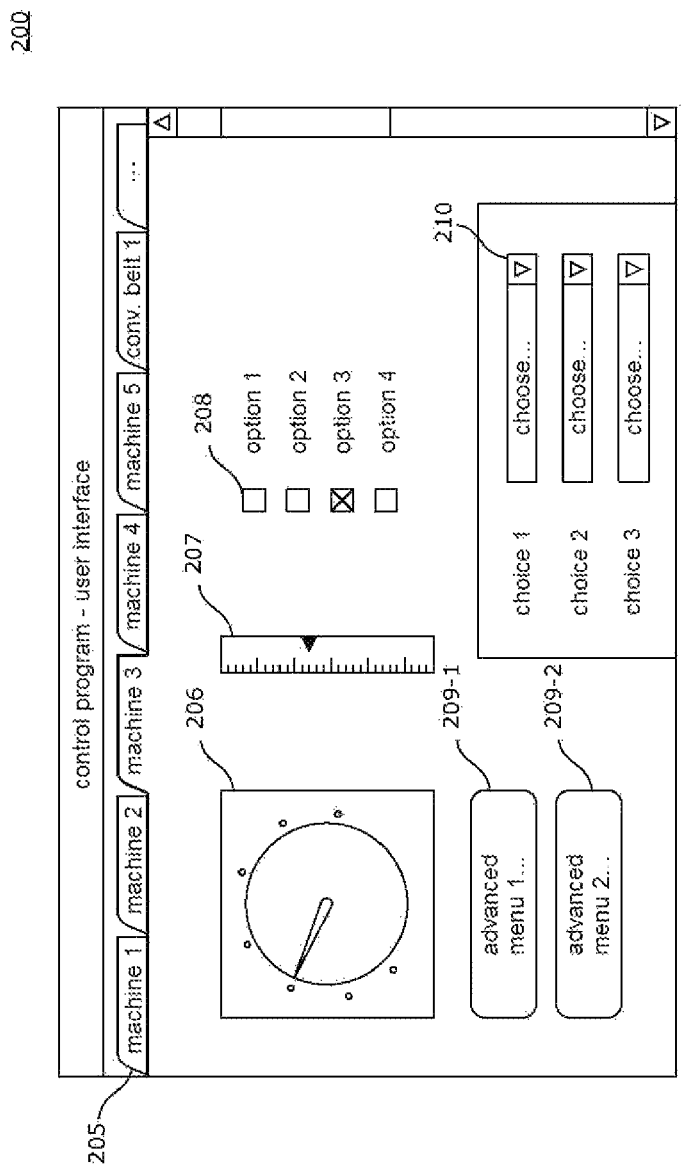
FIG. 2 shows a schematic view of a user interface of a control program according to an embodiment of the invention.

FIG. 2 shows a possible user interface 200 in which various submenus are accommodated through a plurality of tabs 205. In the example according to FIG. 2, a submenu for machine 3 is displayed on the screen, the submenu comprising a multitude of control elements 206, 207, 208, advanced menus 209-1 and 209-2 and choices 210. In the exemplary embodiment according to FIG. 2, a simplified menu navigation is shown, which is sorted according to machines. However, there are a multitude of other menu navigations, which sort the operating elements and the operating pages according to other criteria in a control program and the user interface of the latter. Depending on the application and the task field, various of these menu-navigation alternatives may be more advantageous than other ones.

Typically, the fixed structure and hierarchy of a given control program can, however, not simply be dissolved and subjected to user-defined conversion. Embodiments of the present invention provide a user interface and a suitable method for creating a user interface, which dynamically adapts itself to a context. This dynamic adaptation of the user interface may take place during the running time of the operating module.

By way of example, a user interface of the present invention may adapt itself according to a user group of a logged-in user and/or a location of the operating module and can thus minimize the time required for navigating through the menus of a control program. This can be accomplished in that operating elements directly required in accordance with a context are displayed on a user interface of the control program and made available to a user.

In order to allow such a dynamic creation of a user interface in accordance with a context, all the various digital operating elements are, according to an embodiment of the present invention, not rigidly incorporated into a fixed structure of the control program, but they are stored as individual elements in a storage unit. The storage unit with the operating elements may be comprised in the operating module 110 or it may be located centrally in a remote server, from which the operating module can download the respective operating elements.

An operating element (or a digital operating element) according to the present invention may here be an individual interactive element for controlling, programming, reading and/or monitoring a technical process in a machine or a module. Such an interactive element may e.g. be a rotary control, a control box, a switch or a similar element for interaction of a user with a production process of the production line 101. An operating element according to the present invention may, however, also be a group of various several interactive elements, which are logically related to one another, such as e.g. various control buttons, which are required for controlling a specific module.

According to an embodiment of the present invention, the individual operating elements, which are initially stored in the storage unit without any hierarchy, must be retrievable quickly and in an efficient manner. According to an embodiment, this can be done by means of an operating module context (BMC). The operating module context may e.g. be a location, a user group, a task domain and/or an authorization of a logged-in user to take into account a current production state, a current production product, resources in various modules, and further similar states. As will be described hereinafter, also the nature and the character of the operating module may be taken into consideration upon combining the individual operating elements. According to a further embodiment, the operating module context may also be manually specified, at least partially, by a user of the operating module, whereby a user will be able to compile quickly and intuitively a desired user interface on the operating module.

Figure 3:
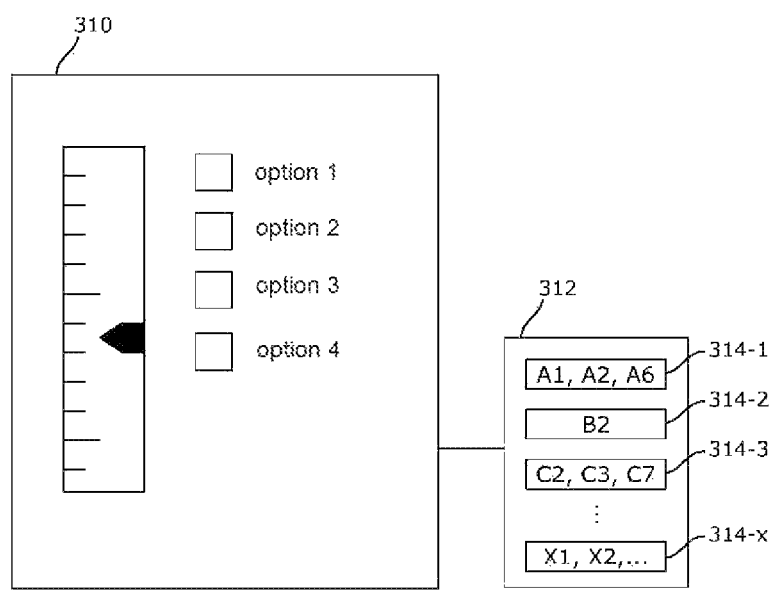
FIG. 3 shows an exemplary operating element for a machine or a module, which is linked with metadata, according to an embodiment of the invention.

In order to retrieve the operating elements in an efficient manner, the operating elements are provided with metadata according to an embodiment. FIG. 3 shows an example of a possible operating element 310 that is linked with respective metadata 312.

The exemplary operating element 310 according to FIG. 3 comprises a controllable scale and a total of four control boxes. As has already been mentioned, the operating element may also comprise a smaller or a larger number of interactive elements. The operating element 310 may be intended for a special control operation for a specific element in a specific machine. The linked metadata 312 comprise a plurality of attributes (or attribute fields) 314-1, 314-2, 314-3, to 314-x. Each of the attributes 314 may comprise one or a plurality of values.

An attribute 314 may e.g. specify whether an operating element can be displayed on a mobile device. In the present example, the attribute may be: "suitable for mobile display" and a value that can be indicated by a specific operating element is either "YES" or "NO" (or "0" and "1" or similar logic parameters). A further attribute may e.g. be the "type of controller". Possible values, which an operating element for the attribute "type of controller" can assume, would be e.g. "two-point controller", "three-point controller", "proportional controller", "integral controller", "PID controller", "differential controller" and so on. In practice, many further attributes for the operating elements can be defined and provided with values.

If, for example, it is specified by an operating module context that a mobile operating element requires all the integral controllers of a plant, the attributes "suitable for mobile display" and "type of controller" of all the stored operating elements will be analyzed and selected accordingly, or not selected. Through further specifications of the operating module context, the selection of the operating elements may be reduced and refined still further.

Figure 4:
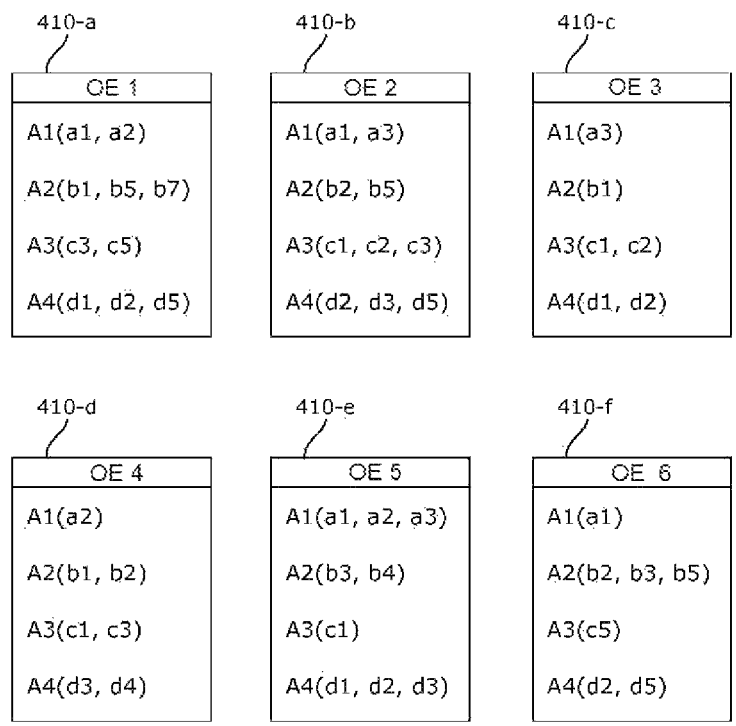
FIG. 4 shows a multitude of operating elements with various values of the respective attributes of each operating element according to an embodiment of the invention.

FIG. 4 shows an example with six operating elements 410-a, 410-b, 410-c, 410-d, 410-e, 410-f, which are available for selection. This merely illustrative example is only intended for illustrating the present invention. In practical use, the number of possible operating elements that are available for selection is normally much higher and may assume orders of magnitude of several thousand operating elements. Also the number of attributes A1, A2, A3 and A4 in the example according to FIG. 4 is intended to be merely illustrative and should not be interpreted as a limitation.

Through one or a plurality of operating module contexts, one or a plurality of operating elements among the six operating elements 410-a, 410-b, 410-c, 410d, 410-e, 410-f can be retrieved and then displayed together on the operating module 110. An operating module context can here be understood as a kind of search query, which specifies one or a plurality of parameters, such as e.g. one or a plurality of attributes and corresponding values.

According to an embodiment, an operating module context comprises one or a plurality of parameters, each of the parameters defining one or a plurality of values of an attribute. Applied to the example according to FIG. 4, a parameter may e.g. be composed as follows:

$$P=A1(a3)$$

By applying the parameter P, a subset of operating elements 410 is created. In this case, the subset of the parameter P comprises all the operating elements, in the case of which the value "a3" is set in the attribute A1, i.e. U={BE2; BE3; BE5}. If the parameter additionally comprises a further value, i.e. a further value for an attribute, the individual values of the parameters are regarded as an OR-operation and a subset of operating elements, which comprise at least one of the plurality of values, is created. The parameter may, for example, be as follows:

$$P=A1(a1;a3)$$

Hence, the subset would be composed as follows: U={BE1; BE2; BE3; BE5; BE6}.

Also an AND-operation can be regarded in a similar way. If, in the same operating module context, also further parameters (i.e. further attribute definitions) are specified, a final subset will comprise the intersection of all the subsets of the individual parameters. For example, two parameters P1 and P2 may be defined in the operating module context:

$$P1=A1(a1;a3) \text{ and } P2=A4(d3)$$

In this way, two separate subsets of operating elements can be formed or defined as an intermediate step: U1={BE1; BE2; BE3; BE5; BE6} and U2={BE2; BE4; BE5}. Through the AND-operation, Uf will therefore be, in a final set, each operating element that is comprised in the intersection of all subsets: UF={BE2; BE5}. This means that, in the example according to FIG. 4, the operating elements BE2 410-b and BE5 410-e would be displayed on the operating module 110, if the above shown operating module context with P1 and P2 were applied. For displaying further operating elements, further operating module contexts can be used.

An advantage of the above described retrieval of operating elements is that, if a value of a parameter (i.e. of an attribute) changes in the operating module context, only a subset must be redefined and the result of the operating elements to be displayed can be re-evaluated quickly.

If, for example, only the location of the operating module 110 changes, the user interface can be adapted dynamically, since e.g. only the subset of the attribute "location" has to be redefined. If, by way of example, a maintenance worker with a portable operating module 110, whose operating module context is set to maintenance work, stands in front of a first machine, the user interface will display on the operating module 110 all the operating elements required for maintenance work on this first machine. If the maintenance worker then moves on and walks to a second machine, the parameter of the attribute "location" will change from the value "machine 1" to "machine 2", whereas all the other attributes that are relevant to the maintenance work will change no longer. Hence, only the subset for "location" has to be newly formed and the intersection of the already existing subsets has to be redefined. An automatic location recognition of the operating module 110 can be accomplished e.g. by RFID, WLAN, Bluetooth or similar means.

This above described method for dynamically creating a user interface reduces the navigation time required for retrieving the necessary operating elements to a minimum, this being a safety-relevant aspect in particular during operation. Due to the reduced navigation time required for retrieving the necessary operating elements on the operating module 110, an intervention in a production and a reaction to events will be possible more quickly than in the case of the classical operating menu, as shown in FIG. 2. A faster reaction will also be possible, when situations occur that are not foreseen by the system, since a user will also be able to influence the operating module context manually and will himself be able to retrieve the appropriate operating elements via attribute definition.

Further attributes may e.g. be a plant characteristic, an assembly unit identification, a component identification, a machine status, a plant status, a personal setting, personal preferences which are determined automatically and/or configured by the user himself, or a former usage behavior. However, not all of the attributes enumerated are necessary, and it is also possible to define further attributes.

Another advantage of the present invention concerns the production of machines and of the respective control software. A manufacturer will no longer be compelled to program a fixed menu of the user interface of a control program, which can be extended, customized or scaled only with difficulty. Instead, a manufacturer will only supply a collection of operating elements provided with suitable metadata, so that, via the operating module context, the correct operating elements will always be displayed automatically on an operating module. Also the modification or the extension of a machine can thus be integrated very easily in the control. In this case, only the respective operating elements for a new module must be entered in the memory and the operating module 110 will immediately be able to retrieve and display the new operating elements.

This will also facilitate maintenance from outside, e.g. by a manufacturer of the machines via VNC accessing, since the operating elements may comprise further attributes, such as "machine", "plant" and "customer", ex works. Also the updating of the metadata for an operating element is highly simplified in this way.

Also the adaptation to a specific type of operating module 110 is simplified by the present invention. According to an embodiment, the operating module 110 can adapt the operating module context to its properties. To this end, various attributes, such as "screen resolution", "suitable for mobile use", "available input device" and so on, can be defined and an operating module 110 sets the values in accordance with its properties, so that the versions of operating elements displayed on the operating module 110 will only be those which the operating module 110 actually can and may use.

According to a further embodiment, a plurality of operating elements, which are displayed on the operating module at one go according to various operating module contexts, may also be stored as a group of operating elements in a storage element. When the operating module contexts are determined once more, the group of operating elements can be retrieved immediately, without the necessity of executing the retrieving procedure again. The operating elements can here be stored in a storage unit of a remote server and the user interface can be formed through suitable referencing to the operating elements on the server. An operating element may here be present in a group or also in an arbitrary number of groups simultaneously. Each group is here independent. For example, a removal from a group does not have any influence on the other dynamic groupings.

The remote server, on which the operating elements and/or groups of operating elements are stored, may be located in the plant, but it may also be located far from the latter. For example, the remote server may be located in a headquarter of a beverage company, which can visualize the statistics of all its blow molding machines. According to a further embodiment, the remote server may be scaled in an arbitrary manner and assume all kinds of forms, from a single component to a (locally separate) control room.

Since many users work from one pool, there may be utilization overlaps. In this case, a technique may be used, which is common practice in file systems and which regulates read and write accesses. For example, an operating element, which is loaded onto an operating module 110, may first only have read permission, and changes in the setting of a machine are only accepted, if the instance of the operating element on the operating module 110 has also write access.

By means of the present invention, operating concepts for a plurality of machines and even for complete plants can be imaged much better via a single system and can be scaled upwards and downwards in an arbitrary manner. According to an embodiment, all the operating modules 110 are filled via a content pool (e.g. the remote server). Extensions, upgrades and changes can be executed very easily, since new contents, i.e. new operating elements, will immediately behave correctly according to their attributes on all operating modules 110 and can be used accordingly, or are not visible. It follows that both the manufacturer and the end user of the system control will save time and costs.

Figure 5:
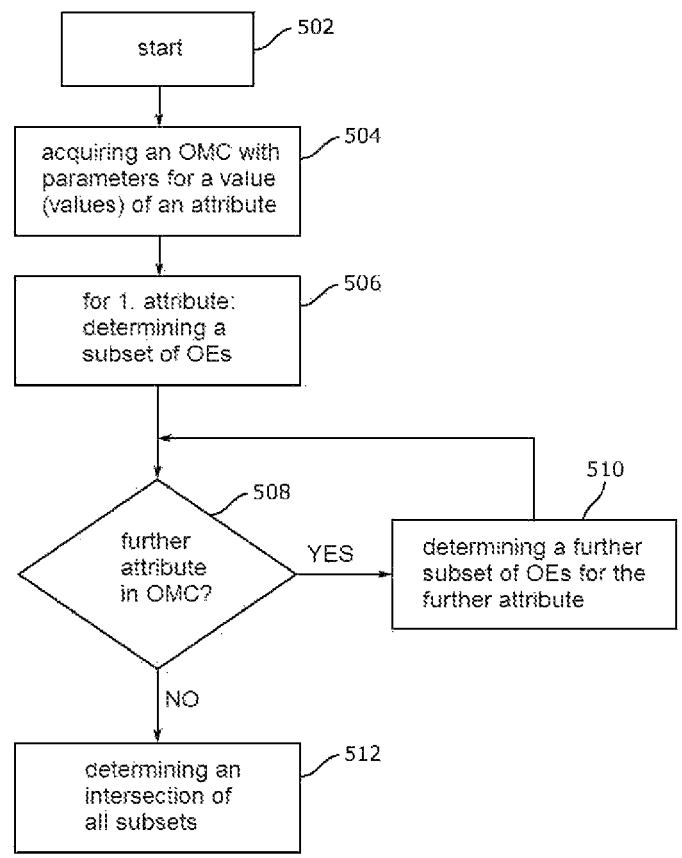
FIG. 5 shows a method of determining the operating elements, which are to be displayed on an operating module, according to an embodiment of the invention.

FIG. 5 shows a method of dynamically creating and displaying a user interface on an operating module 110. The method starts in step 502, and in step 504 an operating module context (OMC) with one or a plurality of parameters for one or a plurality of values of an attribute is acquired. To be precise, the operating module context specifies one or a plurality of parameters and each parameter specifies one or a plurality of values for an attribute.

In step 506, a subset of operating elements from the multitude of all the operating elements is determined for a first attribute. The subset comprises all the operating elements, which have at least one specified value of the attribute. In this way, the above described OR-operation is guaranteed, since by specifying a plurality of values of an attribute in a parameter all the operating elements having at least one of the values will be selected.

In step 508 it will be determined whether a further parameter (i.e. a further attribute with specified values) is still comprised in the OMC. If a further attribute is still comprised in the OMC, the method will continue with step 510, where a further subset of operating elements is determined for the further attribute. The further subset comprises all the operating elements having at least one specified value of the further attribute. Subsequently, the method will continue and determine again in step 508, whether a further attribute is specified in the OMC.

When all the attributes (i.e. all the parameters) in the OMC have been dealt with, i.e. when no further attributes are specified in the OMC, the method continues with step 512. Here, an intersection of all the above determined subsets is determined. The determination and the formation of an intersection guarantees the above described AND-operation, since the operating elements comprised in the intersection are exclusively those having all the above selected values in the attributes in common.

Hence, all the operating elements that are to be displayed on the operating module are determined by means of the last step.

The invention claimed is:

1. A method, comprising: displaying a user interface for operating one or more machines of a production line, wherein the production line comprises a plurality of machines connected via conveyor belts, wherein the user interface comprises one or a plurality of operating elements from a multitude of operating elements for the one or more machines of the production line, wherein the multitude of operating elements is associated with different machines of the plurality of machines of the production line, wherein the multitude of operating elements are interactive elements for one or more of controlling, programming, reading, and monitoring a technical process in the machines, wherein the multitude of operating elements is stored in a storage unit, wherein each operating element of the multitude of operating elements has assigned thereto a multitude of attributes and each of the multitude of assigned attributes has allocated thereto at least one value, and wherein the displaying comprises:

changing a location of an operating module from a first location to a second location;

automatically detecting the change in location of the operating module from the first location to the second location, and dynamically creating the user interface on a screen of the operating module responsive to automatically detecting the change in location from the first location to the second location, wherein the dynamic creation comprises:

acquiring an operating module context, wherein the operating module context is an operating mode specifying one or a plurality of parameters and each parameter specifying one or a plurality of values for an attribute, wherein the operating module context depends at least partially on the second location of the operating module and a position of the second relative to the plurality of machines;

for each of the attributes of the one or of the plurality of parameters, determining a subset from the multitude of operating elements, the subset comprising all the operating elements having at least one specified value of the attribute;

determining from the subsets the one or the plurality of operating elements to be displayed on the user interface, the operating elements to be displayed being those operating elements which are comprised as an intersection in all the subsets; and displaying the operating elements that are the intersection in all the subsets; and operating the production line with the user interface displayed on the screen of the operating module.

2. The method according to claim 1, wherein the one or the plurality of parameters of the operating module context describe values of one of the following attributes: (1) a location of the operating module, (2) a user authorization, (3) a user task description, (4) a safety level, (5) a machine identification, (6) a module identification, (7) a plant characteristic, (8) an assembly unit identification, (9) a component identification, (10) a machine status, (11) a plant status, (12) a personal setting, (13) personal preferences which are at least one of (a) determined automatically and (b) configured by a user, (14) a former usage behavior, and at least one of (a) a location of the machine and (b) the location of the operating module.

3. The method according to claim 2, further comprising the step of automatically specifying one or a plurality of additional parameters, each of the plurality of additional parameters specifying a value according to an identification of the machine or of the operating module.

4. The method according to claim 1, wherein the dynamic creation of the user interface during an operating-module running time comprises a display of the plurality of operating elements on the user interface according to various operating module contexts; and wherein the plurality of operating elements displayed according to various operating module contexts is stored as a group of operating elements in a storage element and retrieved as the group of operating elements.

5. The method according to claim 1, wherein the operating elements are stored in a storage unit of a server and the user interface is formed through referencing to the operating elements on the server.

6. The method according to claim 1, comprising the step of automatically specifying one or a plurality of additional parameters, each of the plurality of additional parameters specifying a value according to an identification of the machine or of the operating module.

7. The method according to claim 1, wherein the user interface displays a separate tab for each of the one or more machines of the production line.

8. The method according to claim 1, wherein the conveyor belts include a first conveyor belt that couples a first machine of the plurality of machines to a second machine of the plurality of machines.

9. The method according to claim 8, wherein the conveyor belts include a second conveyor belt that couples the second machine to a third machine of the plurality of machines.

10. The method according to claim 1, wherein the plurality of machines executes one or more of blow-molding, labeling, and closing of beverage containers.

11. The method according to claim 10, wherein the plurality of machines further executes filling of the beverage containers.

12. The method according to claim 1, wherein displaying the user interface on the screen of the operating module for operating the production line with the operating module context depending at least partially on the second location of the operating module and the position of the second location relative to the plurality of machines is updated from a previous user interface displayed on the screen of the operating module.

13. The method according to claim 12, wherein the previous user interface displayed on the screen of the operating module is based on the first location of the operating module and a position of the first location relative to the plurality of machines.

* * * * *